United States Patent
Feliu et al.

(10) Patent No.: US 9,685,891 B2
(45) Date of Patent: Jun. 20, 2017

(54) SYSTEMS AND METHODS FOR DRIVING A PLURALITY OF MOTORS

(71) Applicant: Schlumberger Technology Corporation, Sugar Land, TX (US)

(72) Inventors: Rodrigo Feliu, Houston, TX (US); Maxim Alekseevich Klyuzhev, Houston, TX (US); Todor K. Sheiretov, Houston, TX (US); Pierre-Arnaud Foucher, Houston, TX (US); Xuedong Yang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/659,661

(22) Filed: Mar. 17, 2015

(65) Prior Publication Data

US 2015/0270759 A1  Sep. 24, 2015

Related U.S. Application Data

(60) Provisional application No. 61/955,912, filed on Mar. 20, 2014.

(51) Int. Cl.
 *H02P 1/54* (2006.01)
 *H02P 5/74* (2006.01)
 *H02K 49/04* (2006.01)

(52) U.S. Cl.
 CPC ............ *H02P 5/74* (2013.01); *H02K 49/043* (2013.01); *H02K 49/046* (2013.01)

(58) Field of Classification Search
 CPC ... H02P 5/68; H02P 5/00; H02P 5/685; Y02T 10/646
 USPC .............................................. 318/34, 51, 112
 See application file for complete search history.

(56) References Cited

U.S. PATENT DOCUMENTS

| | | | |
|---|---|---|---|
| 6,388,353 B1 | 5/2002 | Liu et al. | |
| 6,468,058 B1 * | 10/2002 | Breit | F04C 13/008 |
| | | | 417/423.3 |
| 6,911,752 B1 * | 6/2005 | Breit | F04C 13/008 |
| | | | 310/112 |
| 6,920,936 B2 | 7/2005 | Sheiretov et al. | |
| 7,156,192 B2 | 1/2007 | Guerrero et al. | |
| 7,334,642 B2 | 2/2008 | Doering et al. | |
| 7,668,694 B2 * | 2/2010 | Anderson | E21B 47/042 |
| | | | 700/281 |
| 7,743,849 B2 | 6/2010 | Kotsonis et al. | |
| 7,748,449 B2 * | 7/2010 | Bussear | E21B 43/128 |
| | | | 166/106 |
| 2012/0268049 A1 * | 10/2012 | Lund | E21B 43/128 |
| | | | 318/400.26 |

* cited by examiner

*Primary Examiner* — Rina Duda
(74) *Attorney, Agent, or Firm* — Trevor G. Grove

(57) ABSTRACT

Systems and methods for driving a plurality of permanent magnet synchronous motors are provided. An embodiment of the system can include a first permanent magnet synchronous motor coupled to a first slip coupling, a second permanent magnet synchronous motor coupled to a second slip coupling, and the first permanent magnet synchronous motor and the second permanent magnet synchronous motor can be electrically connected in parallel on a bus.

15 Claims, 8 Drawing Sheets

SYSTEMS AND METHODS FOR DRIVING A PLURALITY OF MOTORS

CROSS-REFERENCE TO RELATED APPLICATIONS

This application claims benefit of U.S. Provisional Patent Application Ser. No. 61/955,912, filed Mar. 20, 2014, which is herein incorporated by reference.

FIELD

Embodiments described generally relate to systems and methods for driving a plurality of motors. More particularly, such embodiments relate to systems and methods for driving a plurality of permanent magnet synchronous motors (PMSMs) electrically connected in parallel on a bus.

BACKGROUND

Electric motors such as induction motors and PMSMs are used in numerous applications to drive a wide range of tools and devices. When a particular application uses a single bus to provide electrical communication between a motor controller and a plurality of electric motors connected in parallel, induction motors are used. Induction motors can easily be operated in parallel and can also easily share a load without hesitation because of the inherent slip between the rotating magnetic field and the rotating shaft.

Induction motors, as compared to PMSMs, have a lower power density and, therefore, require a larger footprint for a given power output. As such, induction motors can be impractical for certain applications when, for example, the size of the electric motor is limited.

There is a need, therefore, for improved systems and methods for driving a plurality of PMSMs.

SUMMARY

Systems and methods for driving a plurality of permanent magnet synchronous motors are provided. An embodiment of the system can include a first permanent magnet synchronous motor coupled to a first slip coupling; a second permanent magnet synchronous motor coupled to a second slip coupling; and a bus connected to the first permanent magnet synchronous motor and the second permanent magnet synchronous motor. The first permanent magnet synchronous motor and the second permanent magnet synchronous motor can be electrically connected in parallel on the bus.

Another embodiment of the system can include a downhole tool located within a borehole. The downhole tool can include a first permanent magnet synchronous motor coupled to a first slip coupling; a second permanent magnet synchronous motor coupled to a second slip coupling; and a bus connected to the first permanent magnet synchronous motor and the second permanent magnet synchronous motor. The first permanent magnet synchronous motor and the second permanent magnet synchronous motor can be electrically connected in parallel on the bus.

An embodiment of the method for driving a plurality of permanent magnet synchronous motors can include powering a bus electrically coupled to a first permanent magnet synchronous motor and a second permanent magnet synchronous motor. The first permanent magnet synchronous motor and the second permanent magnet synchronous motor can be electrically connected in parallel on the bus. The method can also include generating a first rotational energy from the first permanent magnet synchronous motor and a second rotational energy from the second permanent magnet synchronous motor. The method can also include transferring at least a portion of the first rotational energy through a first slip coupling to a first load bearing member. The method can also include transferring at least a portion of the second rotational energy through a second slip coupling to the first load bearing member or a second load bearing member.

DETAILED DESCRIPTION

Figure 1:
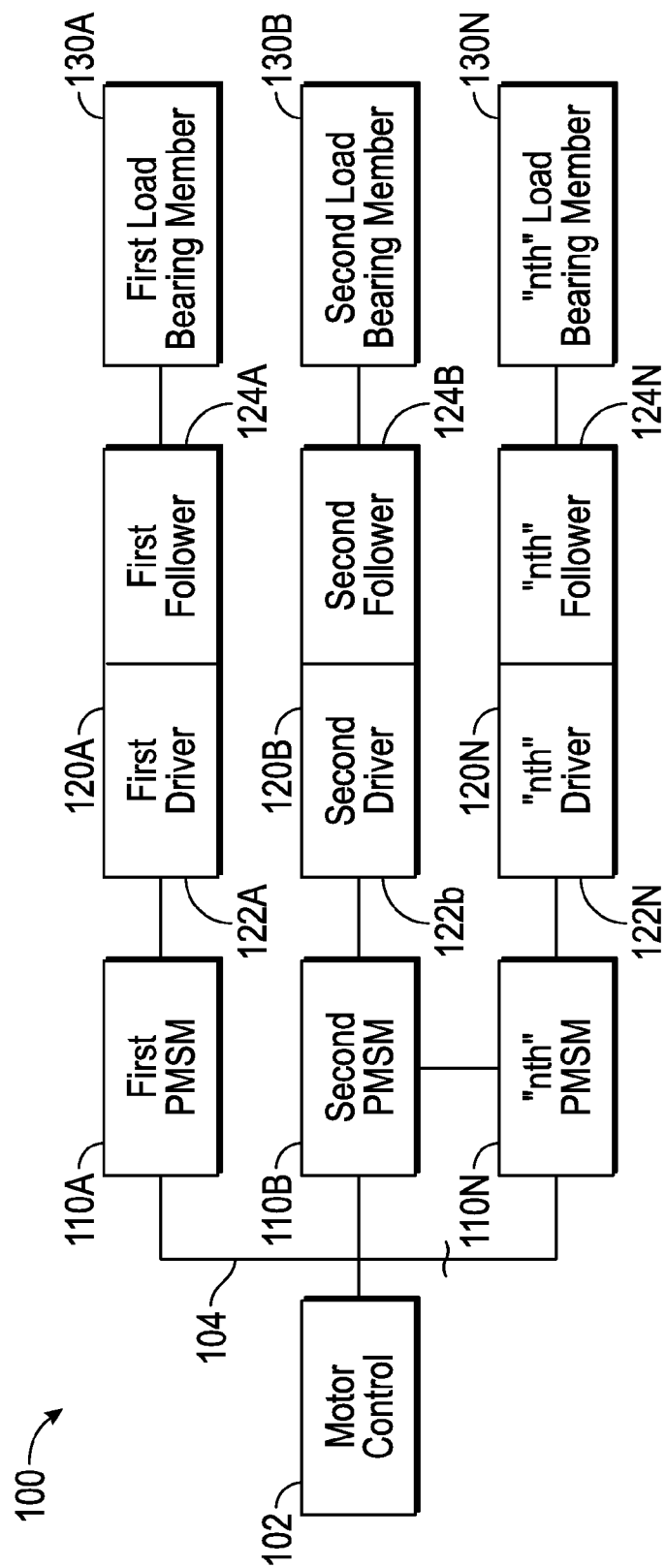
FIG. 1 depicts a schematic of an illustrative system for driving two or more PMSMs each coupled to separate load bearing members, with the PMSMs electrically connected in parallel on a bus, according to one or more embodiments described.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Embodiments of the disclosure generally provide systems having a plurality of PMSMs electrically connected in parallel on a bus and methods for driving the PMSMs. For example, the system can include a first PMSM coupled to a first slip coupling and a second PMSM coupled to a second slip coupling. The system can also include the first PMSM and the second PMSM electrically connected in parallel on a bus. The system can further include a motor controller operatively connected to the first PMSM and the second PMSM via the bus.

The first slip coupling can include a first driver and a first follower, and the second slip coupling can include a second driver and a second follower. The first PMSM can be coupled to the first driver and the first follower can be coupled to a first load bearing member. The second PMSM can be coupled to the second driver and the second follower can be coupled to the first load bearing member or a second load bearing member. As used herein, the phrase "load bearing member" refers to an entity to which energy can be transferred and can do mechanical work. For example, the first and/or the second load bearing member can be a wheel or a drill bit.

The first slip coupling and the second slip coupling can independently be configured to provide rotational energy, such as torque. The torque can be a monotonic function of a differential speed between the first driver and the first follower and/or between the second driver and the second follower.

The slip coupling can be any coupling that has a differential speed between a driver and a follower. The slip coupling can be a passive or active coupling. For example, the slip coupling can be a passive coupling, such as an eddy current coupling. In another embodiment, the slip coupling can be an active coupling where the torque with relation to slip speed can be changed. For example, an active coupling can be a viscosity coupling that has a magnetorheological fluid; thereby, allowing control of the relationship of torque with respect to slip speed. The first and second slip couplings can independently be or include an eddy current coupling or a viscosity coupling. In one embodiment, each of the first slip coupling and the second slip coupling can be a concentric cylinder eddy current coupling or other known or future known coupling that has a differential speed between a driver and a follower.

A downhole system can include a downhole tool adapted to be located within a borehole. The downhole tool can include a first PMSM coupled to a first slip coupling and a second PMSM coupled to a second slip coupling, with the first PMSM and the second PMSM electrically connected in parallel on a bus. Illustrative downhole tools can include, but are not limited to, a tractor, an actuator, a pump, a drill, a milling machine, and a downhole fluid sampling and/or analysis machine.

FIG. 1 depicts an illustrative system 100 for driving two or more PMSMs (three are shown, 110a, 110b, 110n) electrically coupled in parallel on a bus, according to one or more embodiments. The system 100 can include a motor controller 102, an electric circuit or bus 104, two or more PMSMs 110a, 110b, 110n, two or more slip couplings 120a, 120b, 120n, and two or more load bearing members 130a, 130b, 130n, where "n" represents the number of designated components in addition to those designated with "a" and "b". The slip couplings 120a, 120b, and 120n can each include a driver or "fixed speed rotor" 122a, 122b, and 122n and a follower or "variable speed rotor" 124a, 124b, and 124n, respectively.

The value of "n" can be 0, 1, 2, 3, or 4 to about 8, about 10, about 13, about 17, about 20, or greater. For example, "n" can be zero and the system 100 can include the first PMSM 110a and the second PMSM 110b, the first slip coupling 120a and the second slip coupling 120b, the first load bearing member 130a and the second load bearing member 130b. In another example, "n" can be three and the system 100 can include five PMSMs, five slip couplings, and five load bearing members.

The motor controller 102 can be operatively connected to the PMSMs 110a-n via the bus 104. The bus 104 can be configured to supply the electrical power from the motor controller 102 to the PMSMs 110a-n electrically connected in parallel on the bus 104. As such, the system 100 can be configured to provide each PMSM 110a-n with the same or substantially the same electrical power during operation thereof. The bus 104 can include or be one or more electrically conducting materials, e.g., copper or silver, capable of transferring the electrical power from the motor controller 102 to the PMSMs 110a-n. As used herein, the term "bus" refers to one or more electrical conductors for conducting and distributing electric energy.

The PMSMs 110a-n can include any permanent magnet synchronous motor capable of delivering at least a portion of an energy requirement, e.g., rotational energy, to the corresponding load bearing members 130a-n. As used herein, the phrase "permanent magnet" refers to a magnet that retains its magnetic properties in the absence of an inducing field or current. In one example, at least one of the PMSMs 110a-n can include permanent magnets disposed on a surface of its rotor and the stator can include windings. The windings can be constructed in such a way as to produce a sinusoidal flux density in an air gap of the motor. In another example, at least one of the PMSMs 110a-n can include permanent magnets embedded within the rotor. This second PMSM configuration is sometimes referred to as an interior permanent magnet motor (IPMM). The particular design or configuration of each PMSMs 110a-n can be the same or different with respect to one another.

Figure 2:
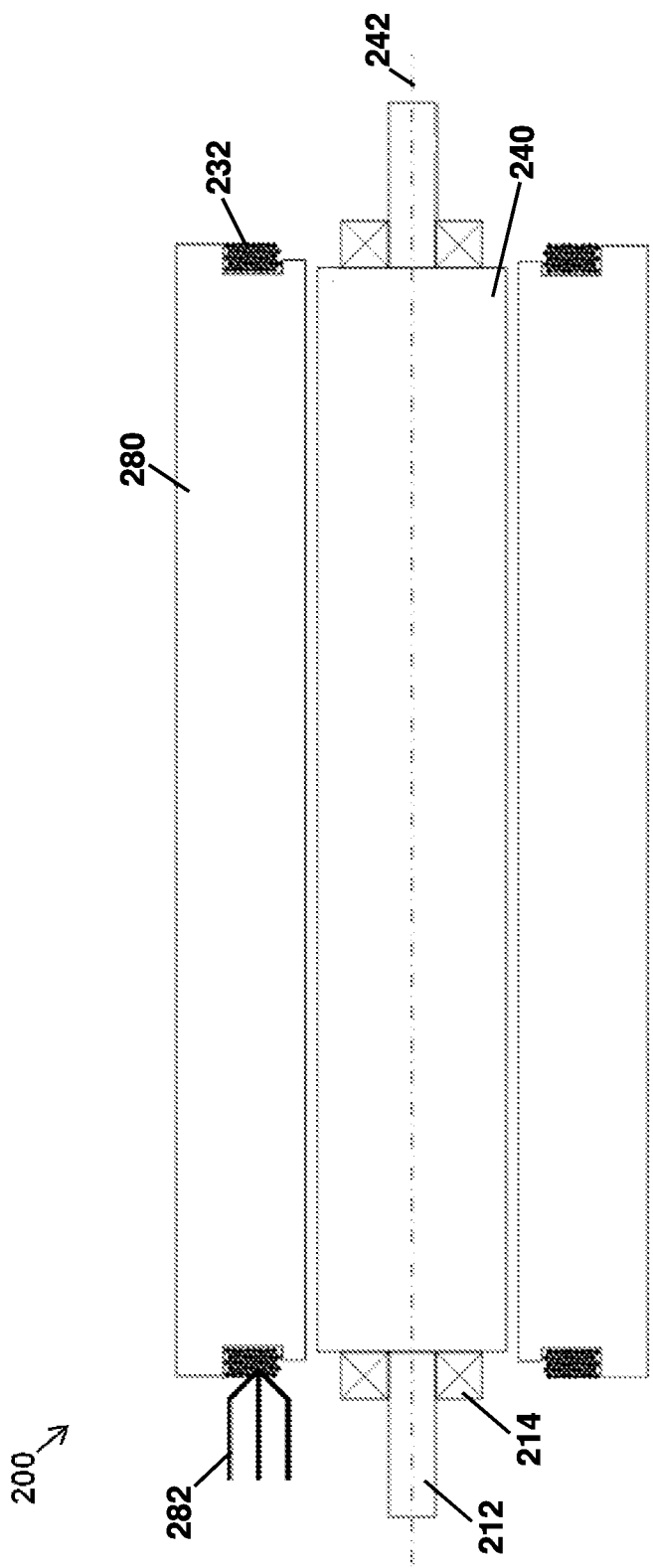
FIG. 2 depicts a cross-sectional view of an illustrative PMSM, according to one or more embodiments described.

FIG. 2 depicts an illustrative PMSM 200, according to one or more embodiments. The PMSM 200 can include a stator 280 and a permanent magnet rotor 240 at least partially disposed within the stator 280. The stator 280 can include windings 232. The windings 232 can be coupled or connected to a three-phase power source 282. The permanent magnet rotor 240 can be configured to rotate when electrical power is supplied to the windings 232. For example, the permanent magnet rotor 240 can include shafts 212 extending therefrom that can be supported on bearings 214. When the electrical power is supplied via the three-phase power source 282, the magnetic field induced in the windings 232 can interact with the magnetic field from the permanent magnet rotor 240, causing the permanent magnet rotor 240 to rotate. The rotational energy generated by the rotating permanent magnet rotor 240 can be transferred through one or both of the shafts 242 to an external body or member, such as the slip couplings 120a-n, or any other slip couplings. As shown, the permanent magnet rotor 240 can be concentrically located within the stator 280, such that the stator 280 and the permanent magnet rotor 240 share a central longitudinal axis 242.

Continuing with reference to FIG. 1, the first PMSM 110a can be configured to generate a first rotational energy, the second PMSM 110b can be configured to generate a second rotational energy, and the "$n^{th}$" PMSM 110n can be configured to generate an "$n^{th}$" rotational energy when powered by the bus 104. Any two or more of the first, second, and $n^{th}$ rotational energies can be the same or different. In at least one embodiment, the first, second, and $n^{th}$ rotational energies can be the same or substantially the same, e.g., +/−5% of one another. At least a portion of the rotational energy generated by the PMSMs 110a-n can be transferred through the corresponding first slip couplings 120a-n to the corresponding first load bearing members 130a-n. The rotational energy transferred through the each of the slip couplings 120a-n to the corresponding load bearing members 130a-n can be the same or different. Suitable PMSMs can include those discussed and described in U.S. Pat. No. 6,388,353, which is incorporated by reference herein.

As shown in FIG. 1, the PMSMs 110a-n can be coupled to the corresponding drivers 122a-n of the slip couplings 120a-n, respectively. For example, the PMSMs 110a-n can be mechanically coupled to the drivers 122a-n, respectively. Similarly, the followers 124a-n can be coupled to the corresponding load bearing member 130a-n, respectively. For example, each follower 124a-n can be mechanically coupled to the corresponding load bearing member 130a-n. Suitable mechanical couplings can include, but are not limited to, a welded connection, corresponding male and female threaded connections, pins, rivets, or any combination thereof.

The drivers 122a-n can be configured to transfer at least a portion of the rotational energy received from the corresponding PMSM 110a-n to the corresponding follower 124a-n. The slip couplings 120a-n can be capable of transmitting the rotational energy through space without physical contact and/or without a mechanical connection therebetween. In one embodiment, one or more of the drivers 122a-n can impart or otherwise transfer at least a portion of the rotational energy received from the corresponding PMSM 110a-n to the corresponding follower 124a-n through opposing magnetic fields. For example, the slip couplings 120a-n can be eddy current couplings. In another embodiment, one or more of the drivers 122a-n can impart or otherwise transfer at least a portion of the rotational energy received from the corresponding PMSM 110a-n to the corresponding follower 124a-n through a fluid medium. For example, any one or more of the slip couplings 120a-n can be a viscous coupling.

The first, second, and third rotational energy generated by the first, second, and third PMSMs 110a-n can include a first torque, a second torque, and an $n^{th}$ torque respectively. In one embodiment, the amount of the first, second, and/or the $n^{th}$ torque transferred to the corresponding load bearing member 130a-n can be a monotonic function of a differential speed between the drivers 122a-n and followers 124a-n. If the first slip coupling 120a, the second slip coupling 120b, and/or the $n^{th}$ slip coupling 120n is an eddy current coupling, rotational energy transferred from the first PMSM 110a, the second PMSM 110b, and/or the $n^{th}$ PMSM 110n can be transferred or transmitted by eddy currents.

Each load bearing member 130a-n can be or include any mechanical apparatus or system that can experience an energy requirement for at least some period of time during operation of the system 100. For example, each load bearing member 130a-n can be or include, but are not limited to, a wheel or a drill bit.

Figure 3:
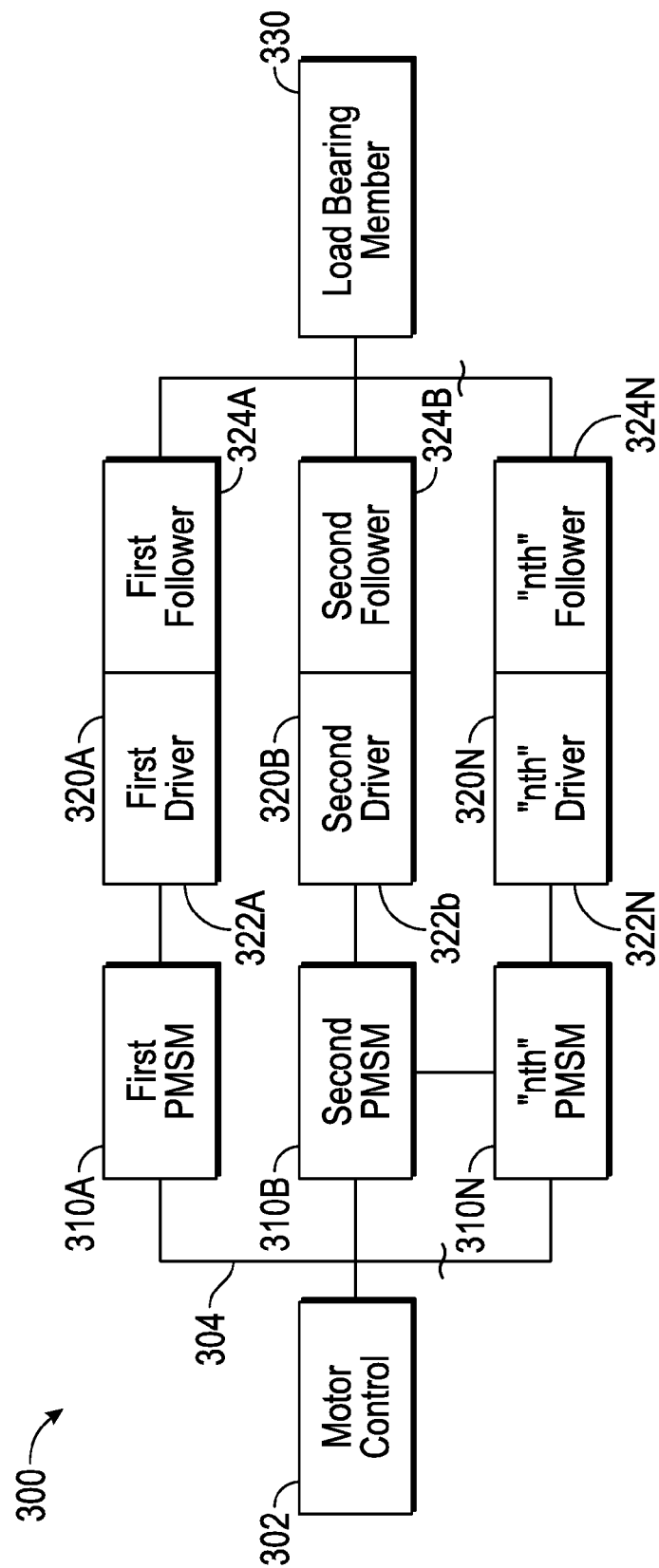
FIG. 3 depicts a schematic of an illustrative system for driving two or more PMSMs each coupled to a common load bearing member, with the PMSMs electrically connected in parallel on a bus, according to one or more embodiments described.

FIG. 3 depicts a schematic of an illustrative system 300 for driving two or more PMSMs (three are shown 310a, 310b, 310n) each coupled to a common load bearing member 330, with the motors electrically coupled in parallel on an electric circuit or bus 304, according to one or more embodiments. The system 300 can include a motor controller 302, the bus 304, two or more PMSMs 310a, 310b, 310n, two or more or more slip couplings (three are shown 320a, 320b, 320n), and a load bearing member 330, where "n" represents the number of designated components in addition to those designated with "a" and "b". The slip couplings 320a, 320b, and 320n can each include a driver or "fixed speed rotor" 322a, 322b, and 322n and a follower or "variable speed rotor" 324a, 324b, and 324n, respectively. Each of the motor control 302, bus 304, PMSMs 310a, 310b and 310n, and slip couplings 320a, 320b, and 320n can be the same as or similar to the motor controller 102, bus 104, PMSMs 110a, 110b, and 110n, and slip couplings 120a, 120b, and 120n discussed and described above with reference to FIG. 1.

As shown in FIG. 3, each follower 324a-n can each be coupled to a single or "common" load bearing member 330. The common load bearing member 230 can be or include any mechanical apparatus or system that can experience an energy requirement for at least some period of time during operation of the system 300. For example, the load bearing member 330 can be or include, but is not limited to, a wheel or a drill bit.

Figure 4:
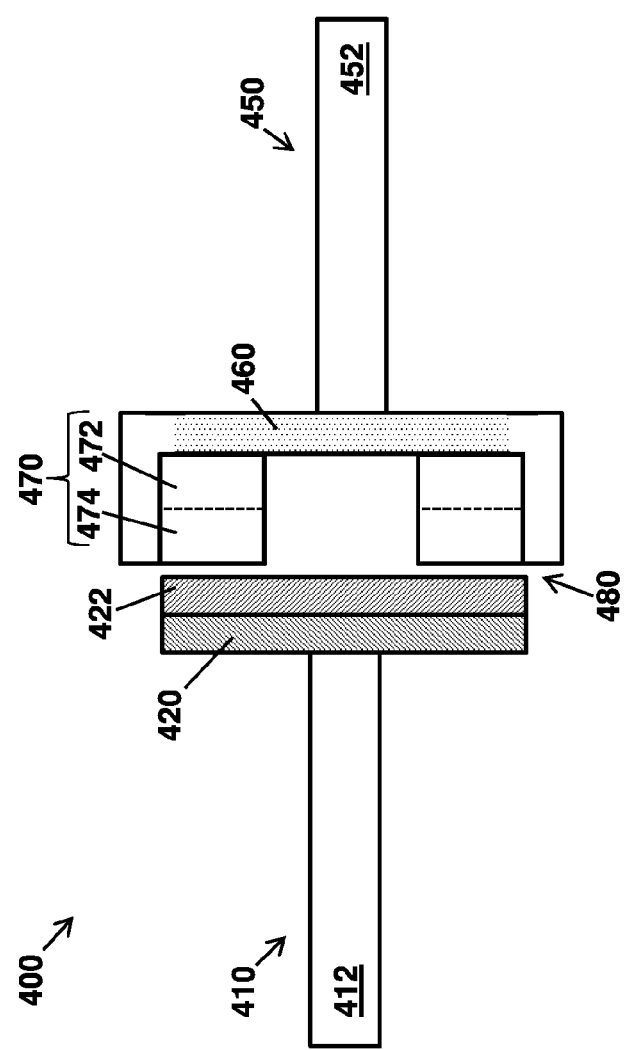
FIG. 4 depicts a cross-sectional view of an illustrative disc-type eddy current coupling, according to one or more embodiments described.

FIG. 4 depicts a cross-sectional view of an illustrative disc-type eddy current coupling 400, according to one or more embodiments. The eddy current coupling 400 can include a driver 410 and a follower 450. Any one or more of the slip couplings 120a-n and 320a-n can independently be or include the eddy current coupling 400. The driver 410 can be coupled to one or more of the PMSMs 110a-n and/or 310a-n discussed and described above with reference to FIGS. 1 and 3. It should be noted, however, that the driver 410 and the follower 450 can be reversed. As such, the follower 450 of the eddy current coupling 400 can serve as a driver and the driver 410 can serve as a follower.

The driver 410 can include an elongated body, e.g., a shaft, 412, a first disc or plate 420, and a second disc or plate 422. The first disc 420 can be disposed on a distal end of the shaft 421 such that a plane of the first disc 420 is generally perpendicular to a longitudinal axis of the elongated body 420. The second disc 422 can be disposed on the first disc 420 such that a plane of the second disc 422 is generally parallel to the plane of the first disc 420 and the first disc 420 is between the elongated body 412 and the second disc 422.

The second disc 420 can be made from or include a ferromagnetic material and the second disc 422 can be made from or include a paramagnetic material and/or a diamagnetic material. Suitable ferromagnetic materials can include, but are not limited to, iron, steel, nickel-iron alloys, such as permalloy, cobalt, and/or alloys thereof. Suitable paramagnetic and/or diamagnetic materials can include, but are not limited to, copper, aluminum, silver, tungsten, and/or alloys thereof. The permanent magnet 470 can be or include a material that is magnetized and creates its own persistent magnetic field. Illustrative magnetic materials suitable for use as the permanent magnet 470 can include, but are not limited to, samarium cobalt (e.g., $SmCo_5$ and $Sm_2Co_{17}$) magnets and neodymium iron boron (e.g., NdFeB) magnets.

The follower 450 can include an elongated body, e.g., a shaft, 452, a housing or support body 460, and one or more permanent magnets 470. The housing 460 can be disposed on a distal end of the elongated body 452. The permanent magnet 470 can be at least partially disposed in or otherwise supported by housing 460. As shown, the permanent magnet 470 can be in the form of an annular ring or body and the housing 460 can have a recess formed therein and configured to receive the permanent magnet 470. In other embodiments, however, the permanent magnet 470 can include a plurality of individual or separate magnets. For example, an array of alternating pole permanent magnets (N—S—N—S) can be supported by housing 460.

The permanent magnet 470 can be in the form of a disc that can generally correspond in size to the first and second discs 420, 422. The permanent magnet 470 can be secured to the housing 460 with one or more mechanical fasteners and/or adhesives or resins. A north pole 474 of the permanent magnet 470 can be in a first side or face of the permanent magnet 470 and a south pole 472 of the permanent magnet 470 can be in a second side or face of the permanent magnet 470. As such, the north pole 474 or the south pole 472 can be oriented toward the second disc 422.

The second disc 422 can be proximate or adjacent to the permanent magnet 470 such that a gap 480 can be present therebetween. Although not shown, a spacer material, e.g., polytetrafluorethylene ("PTFE"), can be disposed between the second disc 422 and the permanent magnet 470 to help maintain the gap therebetween.

The driver 410 of the eddy current coupling 400 can be translated with respect to the follower 450 and an electrical current can be induced in the second disc 422, which can result in a magnetic field from the second disc 422 that can oppose the permanent magnet 470 and "couple" the two components.

Figure 5:
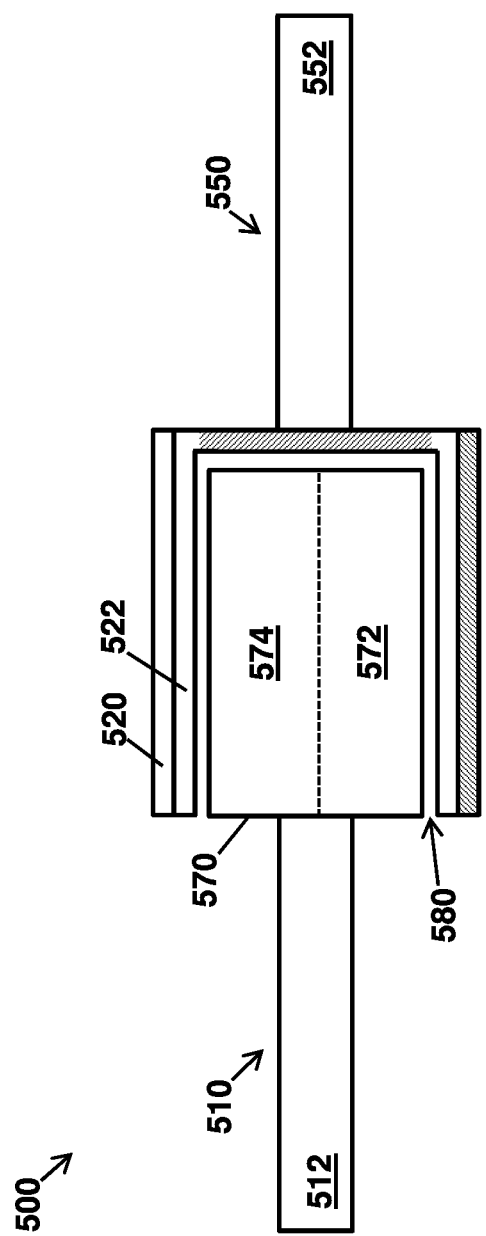
FIG. 5 depicts a cross-sectional view of an illustrative concentric cylinder eddy current coupling, according to one or more embodiments described.

FIG. 5 depicts a cross-sectional view of an illustrative concentric cylinder eddy current coupling 500, according to one or more embodiments. The eddy current coupling 500 can include a driver 510 and a follower 550. The driver 510 can be coupled to one of the PMSMs 110a-n or 310a-n discussed and described above. It should be noted that the driver 510 and the follower 550 can be reversed. As such, the follower 550 of the concentric cylinder eddy current coupling 500 can serve as a driver and the driver 510 can serve as a follower.

The driver 510 can include an elongated body, e.g., a shaft, 512 and one or more permanent magnets 570. As shown, a permanent magnet having a north pole 574 and a south pole 572 is disposed on a distal end of the elongated body 512. In other configurations, however, the one or more magnets 570 can be disposed on and/or at least partially within the elongated body 512. The permanent magnet 570 can be or include a material that is magnetized and creates its own persistent magnetic field. Illustrative magnetic materials suitable for use as the permanent magnet 570 can include, but are not limited to, samarium cobalt (e.g., $SmCo_5$ and $Sm_2Co_{17}$) magnets and neodymium iron boron (e.g., NdFeB) magnets.

The follower 550 can include an elongated body, e.g., a shaft, 552, a first body 522 and a second body 520 disposed at least partially about the first body 520. As shown, the first body 522 can have a generally cylindrical shape with a closed end coupled to the elongated body 552. The second body 520 can be a tubular or annular body disposed about the generally cylindrical sidewall of the first body 522.

The first body 522 can be made from or include a paramagnetic material and/or a diamagnetic material and the second body 520 can be made from or include a ferromagnetic material. Suitable ferromagnetic materials can include, but are not limited to, iron, steel, nickel-iron alloys, such as permalloy, cobalt, and/or alloys thereof. Suitable paramagnetic and/or diamagnetic materials can include, but are not limited to, copper, aluminum, silver, tungsten, and/or alloys thereof.

The magnet 570 can be at least partially disposed within the first body 522 of the follower 550. For example, the magnet 570 can be concentrically disposed or located at least partially within the first body 522 to provide the concentric cylinder eddy current coupling 500. A gap 580 can be formed between the magnet 570 and an inner surface of the first body 522 such that the magnet 570 and the first body 522 can be free of or substantially free of any contact between one another during operation of the concentric cylinder eddy current 500.

The driver 510 of the eddy current coupling 500 can be translated with respect to the follower 550 and an electrical current can be induced in the second layer 522, which can result in a magnetic field from the second layer 522 that can oppose the permanent magnet 570 and "couple" the driver 510 with the follower 550.

Figure 6:
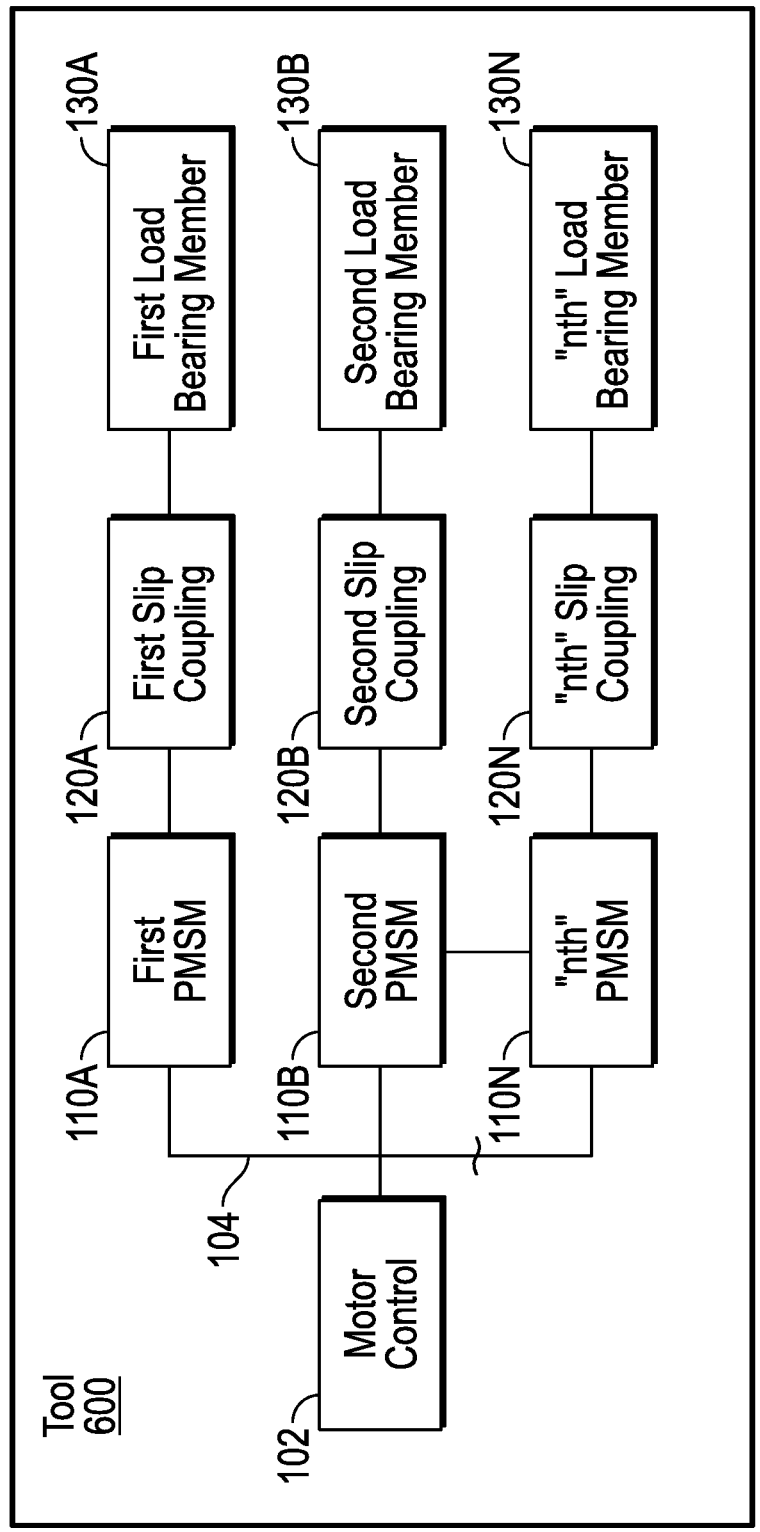
FIG. 6 depicts an illustrative tool that includes the system depicted in FIG. 1, according to one or more embodiments described.

FIG. 6 depicts an illustrative tool 600 that includes the system 100 discussed and described above with reference to FIG. 1, according to one or more embodiments. The tool 600 can include any tool having two or more load bearing members 130a-n each configured to be driven by a PMSM 110a-n. Illustrative tools can include, but are not limited to, a modular wheeled conveyance system, e.g., a modular wheeled wireline conveyance system, a multi-wheeled vehicle that includes at least a first PMSM on a first wheel and a second PMSM on a second wheel, a wheeled vehicle that includes multiple wheels configured to be driven by a plurality of PMSMs, a multi-stage pump, a multi-stage conveyer where the supply rate of different stages need to be within a certain range independent of a load, or any combination thereof.

The tool 600 can be configured to operate in any environment, whether downhole, subsea, on the surface, or in the air. In one embodiment, the tool 600 can be a downhole tool and the downhole tool can be located in a borehole. Illustrative downhole tools can be or include, but are not limited to, downhole tractors, drilling tools, milling tools, pumps, or any combination thereof. Illustrative downhole tools can include those discussed and described in U.S. Pat. Nos. 6,920,936; 7,156,192; 7,334,642; and 7,743,849, which are incorporated by reference herein.

Figure 7:
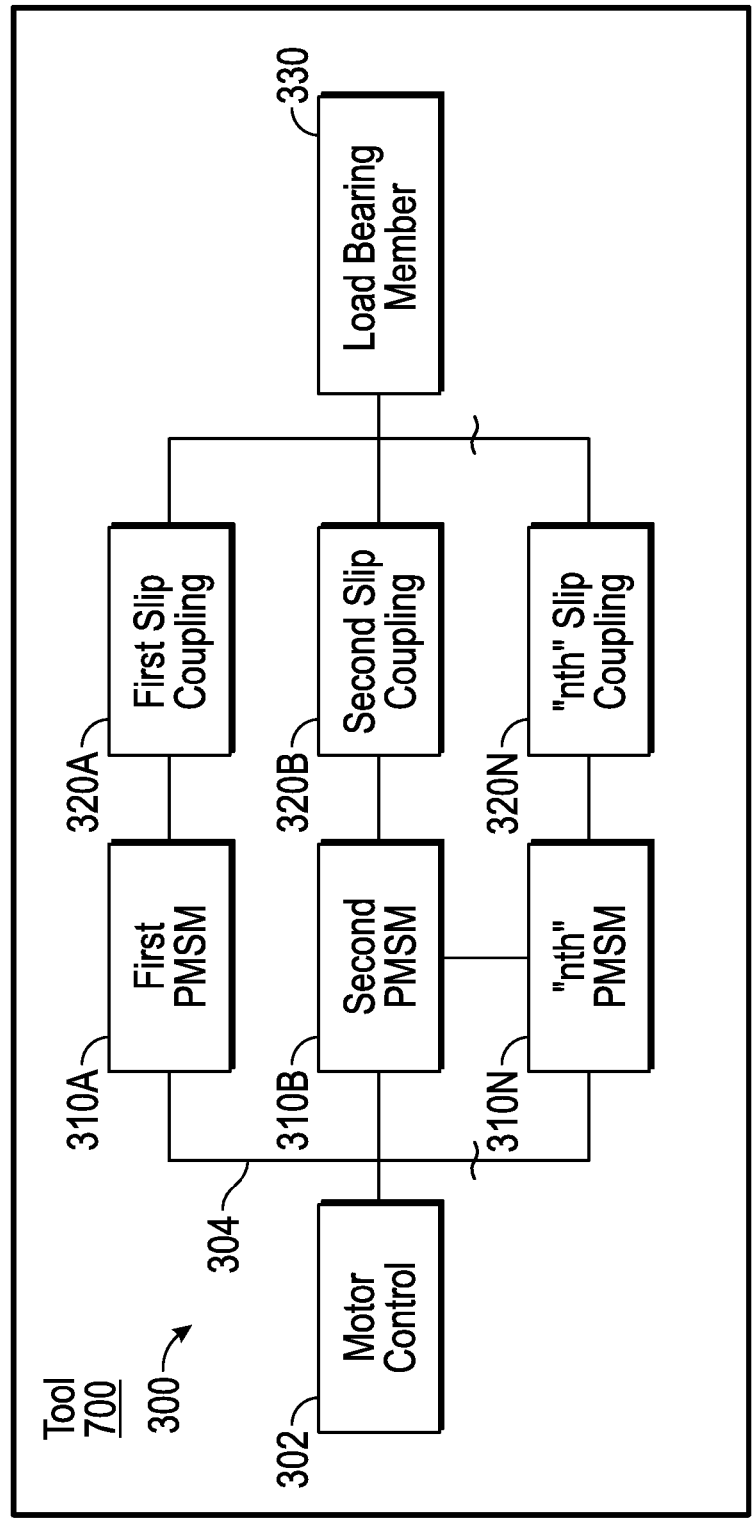
FIG. 7 depicts an illustrative tool that includes the system depicted in FIG. 3, according to one or more embodiments described.

FIG. 7 depicts an illustrative tool 700 that includes the system 300 discussed and described above with reference to FIG. 3, according to one or more embodiments. The tool 700 can include any tool having at least one common load bearing member 330. Illustrative tools can include, but are not limited to, a wheeled conveyance system, a multi-wheeled vehicle, a multi-stage pump, a multi-stage conveyer where the supply rate of different stages need to be within a certain range independent of a load, or any combination thereof, where one or more load bearing components 330, e.g., a wheel, can be driven by two or more PMSMs 310a-n. In one embodiment, the tool 700 can be a downhole tool. Illustrative downhole tools can include those discussed and described above with reference to FIG. 6.

It should be noted that the tools 600 and 700, while shown as including the motor controllers 102, 302 of systems 100 and 300, respectively, the motor controllers 102, 302 can be separate and apart from the respective tool 600 and 700. For example, if the tools 600 and 700 are downhole tractors, the motor controllers 102, 302 can be part of the tools 600, 700 or the motor controllers 102, 302 can be separate from the tools 600, 700, e.g., located at the surface when the tool is in a borehole.

Figure 8:
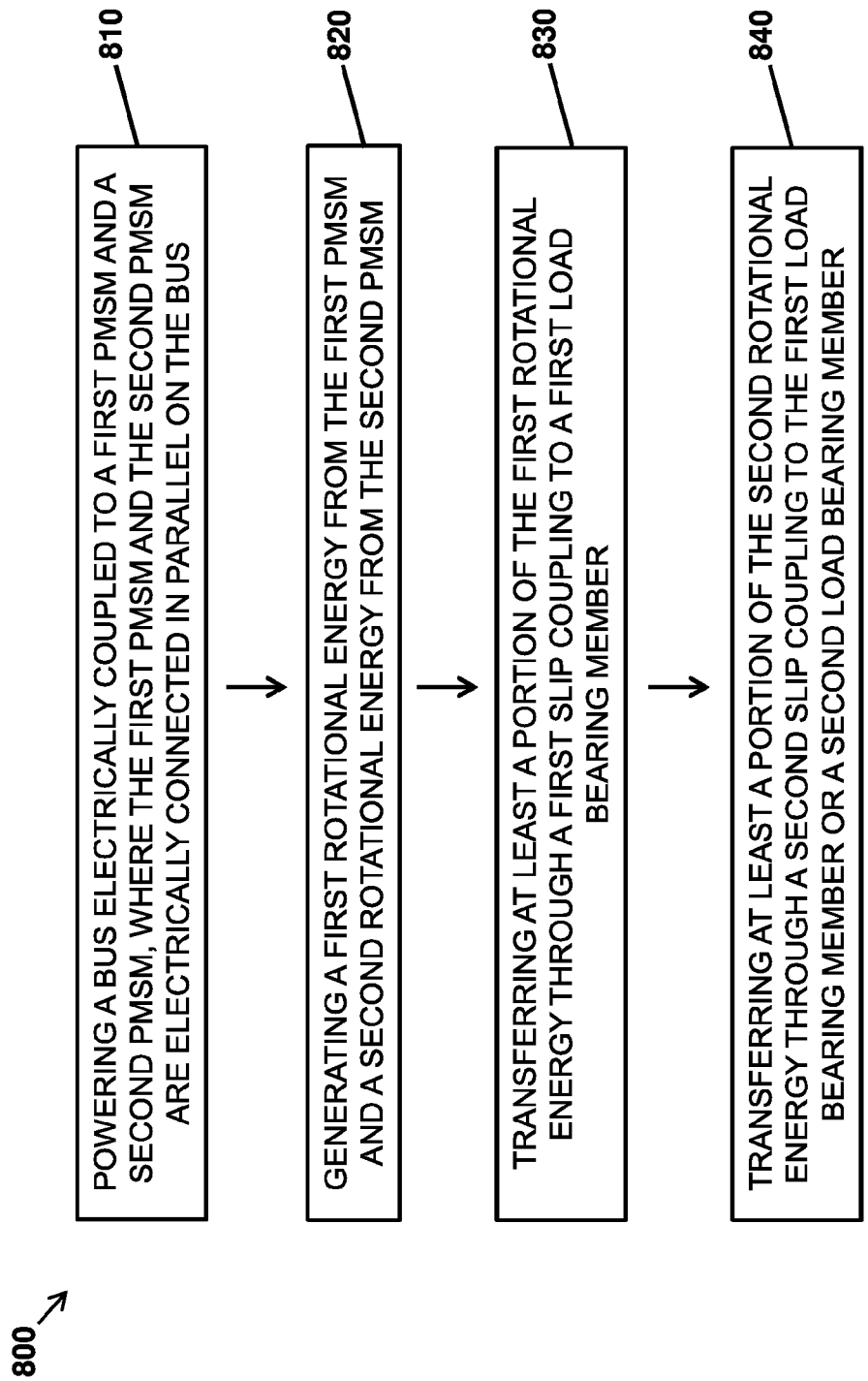
FIG. 8 depicts an embodiment of a method for driving a plurality of PMSMs, with the PMSMs electrically connected in parallel on a bus, according to one or more embodiments described.

FIG. 8 depicts an embodiment of a method 800 for driving a plurality of PMSMs with the PMSMs electrically coupled in parallel on a bus, according to one or more embodiments. At 810, the method can include powering a bus electrically coupled to a first PMSM and a second PMSM, where the first PMSM and the second PMSM can be electrically coupled in parallel on the bus. The first PMSM and the second PMSM can be electrically connected in parallel on the bus. At 820, the method can also include generating a first rotational energy from the first PMSM and a second rotational energy from the second PMSM. At 830, the method can include transferring at least a portion of the first rotational energy through a first slip coupling to a first load bearing member. At 840, the method can include transferring at least a portion of the second rotational energy through a second slip coupling to the first load bearing member or a second load bearing member.

Continuing with reference to FIGS. 1 and 3, during operation the systems 100 and/or 300 can be referred to as a dynamic system with an input and output and the motor controller 102 can operate the PMSMs 110a-n and/or the PMSMs 310a-n using an open loop control scheme or a closed loop control scheme also commonly referred to as a "sensorless" control scheme. For example, the motor controllers 102 and/or 302 may or may not use feedback from the PMSMs 110a-n and/or 310a-n to adjust an input of the motor controller 102 and/or 302. In the open loop control scheme, feedback from an output of the PMSMs 110a-n and 310a-n is not used during operation and the PMSMs 110a-n and 310a-n can be driven by the input from the motor controllers 102, 302 based on a predetermined frequency and amplitude for each phase of voltage. In the closed loop control scheme, feedback from the PMSMs 110a-n and 310a-n can be used during operation to adjust the input from the motor controllers 102, 302.

If the motor controllers 102, 302 use the "open loop" control scheme, the motor controllers 102, 302 can control a speed of the PMSMs 110a-n and 310a-n by adjusting a frequency of the electrical power transmitted or transferred to the PMSMs 110a-n and 310a-n. The motor controller 102 can also control the torque at the PMSMs 110a-n and 310a-n by setting the voltage to correspond to a predetermined torque for a given speed. For example, the torque needed at the PMSMs 110a-n and 310a-n during operation at a given speed can be determined or estimated and the motor controllers 102, 302 can set the voltage to the PMSMs 110a-n and 310a-n to correspond to the greatest expected torque at the given speed.

If the motor controllers 102, 302 use the "closed loop" or "sensorless" control scheme, the feedback loop exists, although there is no physical position sensor attached to the motor shafts of the PMSMs 110a-n and 310a-n. Instead, the position of the shafts can be calculated in real time based on measurements of electrical response of the PMSMs 110a-n and 310a-n to the excitation by the motor controllers 102, 302. Similar to the "open loop" control scheme, the motor controllers 102, 302 can control the speed of the PMSMs 110a-n and 310a-n by adjusting the frequency of the electricity transmitted to the PMSMs 110a-n and 310a-n. In determining the voltage supplied to the PMSMs 110a-n and 310a-n, however, the "closed loop" control scheme can use the feedback to calculate or estimate the voltage required and can set the voltage to the PMSMs 110a-n and 310a-n.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A system for driving a plurality of motors, comprising:
   a first permanent magnet synchronous motor coupled to a first slip coupling, wherein the first slip coupling comprises a first driver and a first follower, wherein the first permanent magnet synchronous motor is coupled to the first driver and the first follower is coupled to a first load bearing member;
   a second permanent magnet synchronous motor coupled to a second slip coupling, the second slip coupling comprises a second driver and a second follower wherein the second permanent magnet synchronous motor is coupled to the second driver and the second follower is coupled to the first load bearing member or a second load bearing member, and wherein the first load bearing member and the second load bearing member are in parallel to one another; and
   a bus connected to the first permanent magnet synchronous motor and the second permanent magnet synchronous motor, wherein the first permanent magnet synchronous motor and the second permanent magnet synchronous motor are electrically connected in parallel on the bus.

2. The system of claim 1, wherein the first load bearing member and the second load bearing member each comprises an entity to which energy can be transferred and can do mechanical work.

3. The system of claim 1, wherein the first slip coupling is configured to provide a rotational energy, the rotational energy comprising a torque, and wherein the torque is a monotonic function of a differential speed between the first driver and the first follower, and
   wherein the second slip coupling is configured to provide a rotational energy, the rotational energy comprising a torque, and wherein the torque is a monotonic function of a differential speed between the second driver and the second follower.

4. The system of claim 1, wherein the first slip coupling and the second slip coupling each comprises an eddy current coupling or a viscosity coupling.

5. The system of claim 1, wherein the first slip coupling and the second slip coupling each comprises a concentric cylinder eddy current coupling.

6. The system of claim 1, further comprising a motor controller operatively connected to the first permanent magnet synchronous motor and the second permanent magnet synchronous motor via the bus.

7. The system of claim 1, wherein the first slip coupling and the second slip coupling are active couplings.

8. A downhole system, comprising:
   a downhole tool located within a borehole, wherein the downhole tool comprises:
     a first permanent magnet synchronous motor coupled to a first slip coupling, wherein the first slip coupling comprises a first driver and a first follower, wherein the first permanent magnet synchronous motor is coupled to the first driver and the first follower is coupled to a first load bearing member;
     a second permanent magnet synchronous motor coupled to a second slip coupling, the second slip coupling comprises a second driver and a second follower wherein the second permanent magnet synchronous motor is coupled to the second driver and the second follower is coupled to the first load bearing member or a second load bearing member, and wherein the first load bearing member and the second load bearing member are in parallel to one another; and
     a bus connected to the first permanent magnet synchronous motor and the second permanent magnet synchronous motor, wherein the first permanent magnet synchronous motor and the second permanent magnet synchronous motor are electrically connected in parallel on the bus.

9. The downhole tool of claim 8, wherein the downhole tool comprises a tractor, an actuator, a pump, a drill, or a milling machine.

10. A method for driving a plurality of motors, comprising:
    powering a bus electrically coupled to a first permanent magnet synchronous motor and a second permanent magnet synchronous motor, wherein the first permanent magnet synchronous motor and the second permanent magnet synchronous motor are electrically connected in parallel on the bus;

generating a first rotational energy from the first permanent magnet synchronous motor and a second rotational energy from the second permanent magnet synchronous motor;

transferring at least a portion of the first rotational energy through a first slip coupling to a first load bearing member; and transferring at least a portion of the second rotational energy through a second slip coupling to a second load bearing member, and wherein the first load bearing member and the second load bearing member are in parallel to one another.

11. The method of claim 10, wherein the first rotational energy and the second rotational energy have different values.

12. The method of claim 10, wherein the first slip coupling comprises a first driver and a first follower and the second slip coupling comprises a second driver and a second follower, wherein the first rotational energy comprises a first torque, wherein the first torque transferred to the first load bearing member is a monotonic function of a differential speed between the first driver and the first follower, wherein the second rotational energy comprises a second torque, and wherein the second toque transferred to the first load bearing member or the second load bearing member is a monotonic function of a differential speed between the second driver and the second follower.

13. The method of claim 10, wherein the bus is powered by transferring electrical power from a motor controller operatively connected on the bus; and adjusting the first rotational energy of the first permanent magnet synchronous motor and the second rotational energy from the second permanent magnet synchronous motor by changing a frequency of the transferred electrical power, a voltage of the transferred electrical power, or a combination thereof.

14. The method of claim 10, wherein the at least a portion of the second rotational energy transferred through the second slip coupling is transferred to the second load bearing member.

15. The method of claim 12, wherein the first load bearing member comprises a first wheel of a downhole tractor, and wherein the second load bearing member comprises a second wheel of the downhole tractor.

* * * * *